United States Patent
Monteux et al.

(10) Patent No.: US 10,019,152 B2
(45) Date of Patent: Jul. 10, 2018

(54) MOBILE TERMINAL WITH A TOUCH SCREEN THAT DISPLAYS A PLURALITY OF PAGES

(75) Inventors: Guillaume Monteux, Paris (FR); Nicolas Rucine, Nantes (FR); Raphaël Monrouzeau, Maisons Alfort (FR); Luc Vauvillier, Le Plessis-Bouchard (FR)

(73) Assignee: MILIBRIS, Paris (FR)

( * ) Notice: Subject to any disclaimer, the term of this patent is extended or adjusted under 35 U.S.C. 154(b) by 390 days.

(21) Appl. No.: 13/394,913

(22) PCT Filed: Sep. 13, 2010

(86) PCT No.: PCT/EP2010/063368
§ 371 (c)(1),
(2), (4) Date: Oct. 18, 2012

(87) PCT Pub. No.: WO2011/029928
PCT Pub. Date: Mar. 17, 2011

(65) Prior Publication Data
US 2013/0044066 A1    Feb. 21, 2013

(30) Foreign Application Priority Data
Sep. 11, 2009   (FR) .................... 09 56281

(51) Int. Cl.
*G06F 3/0488* (2013.01)
*G06F 3/0483* (2013.01)

(52) U.S. Cl.
CPC ........ *G06F 3/04883* (2013.01); *G06F 3/0483* (2013.01); *G06F 2203/04803* (2013.01)

(58) Field of Classification Search
CPC ........ G06F 3/01; G06F 3/048; G06F 3/04883; G06F 3/0483; G06F 2203/04803
USPC ............................................. 345/173
See application file for complete search history.

(56) References Cited

U.S. PATENT DOCUMENTS

| | | | |
|---|---|---|---|
| 5,463,725 A * | 10/1995 | Henckel et al. | 715/776 |
| 2003/0020687 A1* | 1/2003 | Sowden et al. | 345/157 |
| 2007/0083828 A1* | 4/2007 | Toriyama et al. | 715/816 |
| 2008/0079692 A1* | 4/2008 | Liang et al. | 345/156 |
| 2008/0088617 A1 | 4/2008 | Izumida | |

FOREIGN PATENT DOCUMENTS

| | | |
|---|---|---|
| EP | 1 058 181 | 12/2000 |
| WO | WO 2008/000435 | 1/2008 |

OTHER PUBLICATIONS

International Search Report as issued for PCT/EP2010/063368.

* cited by examiner

*Primary Examiner* — Amr Awad
*Assistant Examiner* — Wing Chow
(74) *Attorney, Agent, or Firm* — Pillsbury Winthrop Shaw Pittman LLP

(57) ABSTRACT

A mobile terminal with a touch screen includes a browsing and searching system that reproduces the sensation of leafing through a work on paper and a read mode that does not alter the structure or layout of the original page. The main benefit of this solution is that it can be used to read a digital publication in the same manner as the equivalent paper version, both in terms of leafing and reading, while taking account of the technical specifications of the read terminal.

Figure 1:
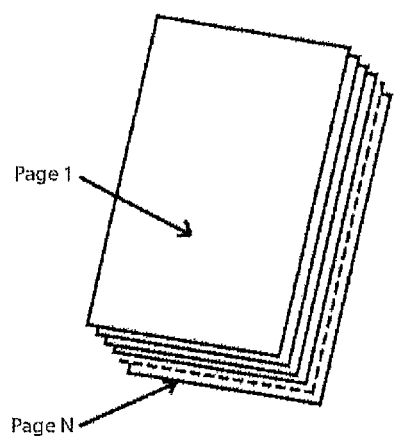

6 Claims, 6 Drawing Sheets

MOBILE TERMINAL WITH A TOUCH SCREEN THAT DISPLAYS A PLURALITY OF PAGES

CROSS REFERENCE TO RELATED APPLICATIONS

This application is the U.S. National Stage of PCT/EP2010/063368, filed Sep. 13, 2010, which in turn claims priority to French Patent Application No. 0956281, filed Sep. 11, 2009, the entire contents of all applications are incorporated herein by reference in their entireties.

TECHNICAL FIELD OF THE INVENTION

The present invention relates to a mobile terminal with a touch screen. The invention is situated in the field of MMI (Man-Machine Interfaces), applied to digital reading.

TECHNOLOGICAL BACKGROUND OF THE INVENTION

Currently, applications on mobile terminals, by virtue of their reduced display capacity, do not enable content of the press/magazine type to be presented and do not reproduce browsing and reading that are similar to paper use.

Various solutions propose reading in stream mode: The articles are previously extracted and presented in list form comprising the title, a brief description or introductory paragraph to encourage reading and sometimes an associated image. Once the article is selected, the reading mode presents the text of the article in a column whose width is the width of the mobile terminal screen.

However, these solutions present a certain number disadvantages.

Therefore, none of these solutions take into account the notion of pagination or respect the layout, fonts and style guide of the original document.

GENERAL DESCRIPTION OF THE INVENTION

In this context, the present invention aims to provide a terminal with a touch screen in which the issue is to reproduce in terms of use the sensation of reading paper on a mobile terminal and to enable press groups to be able to make their publications paperless by disregarding the material and technical constraints of various reading terminals.

For this purpose, the invention proposes a mobile terminal with a touch screen characterized in that the terminal comprises storage means on which a plurality pages are stored;
means for displaying in landscape mode two stacks of recto verso pages respectively called the left stack and the right stack and respectively ordered in the ascending direction and the descending direction, or a single stack containing all of the recto verso pages, ordered in the ascending or descending direction, all belonging to the plurality of stored pages;
means for pre-loading at least two recto verso pages preceding the page whose back is displayed in the left stack, called the left current page, and/or at least two recto verso pages following the page whose front is displayed on the right stack, called the right current page, on said display means, said pre-loadings are carried out within the limit of the number of pages respectively preceding and/or following the left and right current pages;
means for controlling said display means comprising detection touch means able to detect the placement, sliding and lifting of a finger of a user;
means for detecting the target page that is defined as being either the left current page or the right current page, depending on the detection of the finger placement;
means for executing a rotation and/or translation composite of said target page;
means for going from the left and right current pages, respectively called pages N−1/N, to the next pages in the right stack, called pages N+1/N+2, or to the preceding pages in the left stack, called pages N−3/N−2, depending on the detection of the lifting of a finger.
means for going from said pages N+1/N+2 to the pages following pages N+1/N+2, called pages N+3/N+4, while the passage from pages N−1/N to pages N+1/N+2 is in progress;
means for going from said pages N−3/N−2 to the pages preceding pages N−3/N−2, called pages N−5/N−4, while the passage from pages N−1/N to pages N−3/N−2 is in progress;

Thanks to the invention, a browsing and searching system that reproduces the sensation of leafing through a work on paper and a read mode that does not alter the structure or layout of the original page is utilized. The main advantage of this solution is that it can be used to read a digital publication in the same manner as the equivalent paper version, both in terms of leafing and reading, while taking account of the technical specifications of the read terminal. No existing solution offers a reading experience of this type. The invention is intended for editors and press groups wishing to disseminate their content on mobile terminals. Therefore, the final user of the invention will be the client who consults the works delivered on his mobile terminal.

Pre-loading of pages is understood to refer to the passage of a page from the storage means to the random access memory of the mobile terminal with a touch screen in view of an instantaneous display of said page.

Stack is understood to refer to a given set of pages displayed some on top of the others on the touch mobile terminal.

Passage is understood to refer to an animation type transition (defined by the composite of a rotation and a translation that is variable over time) when the current page is changed.

Passage from page N to page N+1 or page N−1 is understood to refer to the act of displaying the page following the current page in lieu of the current page or the page preceding the current page in lieu of the current page, all depending on the detection of the lifting of a finger.

The terminal according to the invention may also present one or more of the characteristics below, considered individually or according to all technically possible combinations:

said control means comprising:
means for stopping the passage from said pages N−1/N to the following pages, called pages N+1/N+2, and returning from the following pages, called pages N+1/N+2, to the current pages, called pages N−1/N;
means for stopping the passage from said pages N−1/N to the preceding pages, called pages N−3/N−2, and returning from the preceding pages, called pages N−3/N−2, to the current pages, called pages N−1/N;
said means for going from pages N−1/N to pages N+1/N+2 or to pages N−3/N−2 depending on the detection of the finger lifting make pages N−1/N go to pages N+1/N−2 or to pages N−3/N−2, provided that the sliding has reached a threshold value;

said control means comprise means for executing a composite of a variable angle rotation and/or a variable vector translation, of said target page, these variations being dependent on said detected sliding;

the mobile terminal according to the invention comprises means to emit a sound effect during passage from current pages N−1/N to pages N+1/N+2 or to pages N−3/N−2.

DETAILED DESCRIPTION OF PREFERRED FORMS OF EMBODIMENT OF THE INVENTION

Other characteristics and advantages of the invention will clearly emerge from the description given below, for indicative and in no way limiting purposes, with reference to the attached FIGS. 1 to 12.

The terminal according to the invention comprises several software means (i.e., applications) dedicated to implementing the invention.

The terminal with a touch screen according to the invention first of all comprises searching means that enable displacement in the digital publication. This method is both visual and gestural. It enables a sensation of leafing to be reproduced on the tactile mobile terminal.

As the display means are generally rectangular, two reading positions will be distinguished, depending on the orientation of the display means: Reading in portrait mode and reading in landscape mode. The reading mode is defined when the application is launched, or if the terminal allows this, automatically depending on the orientation of the terminal.

Portrait Mode

Figure 2:
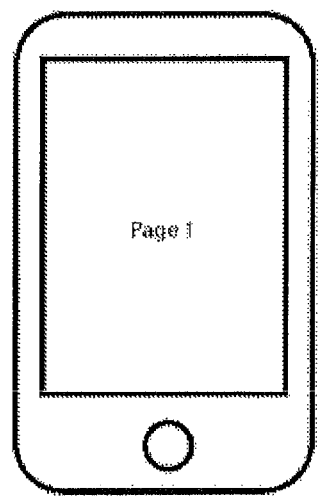

Portrait mode offers the user a layout of digital publication pages in the form of a stack of pages. Each page only comprises a front. Page 1 is situated on top of the stack; the last page (page N) is situated on the bottom of the stack (FIG. 1). The terminal displays the stack seen from above. Only the top page is visible (FIG. 2).

Figure 3:
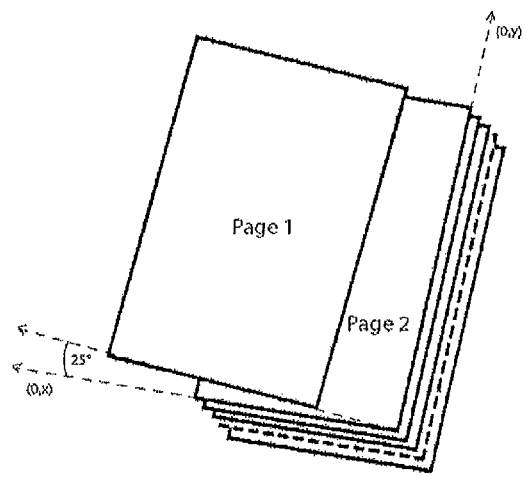
Figure 4:
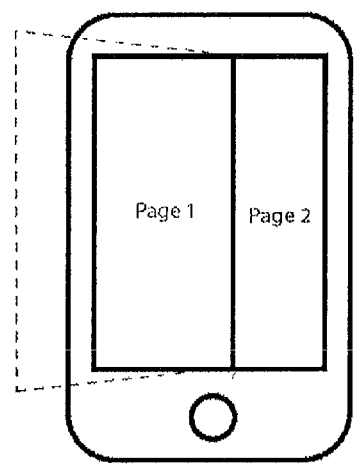

Passage from one page to another is done visually through animation. To go to the following page, the top page of the stack slides leftward and then leaves the terminal screen, revealing the page underneath. To improve the visual rendering of the transition and retranscribe a sensation of real page riffling (separation of the page), the movement is composed of both a negative translation on the X axis equal to the width of the page as well as a rotation having the right edge of the page as the axis and an angle on the order of 25 degrees (FIGS. 3 and 4).

To return to the previous page, the animation takes place in the opposite direction: The previous page arrives from the left and covers the screen during the reverse translation.
Animation Initiation and Control Page turning is controlled by the user sliding his finger on the touch screen of the terminal. This control means enables both the direction as well as the sequence of the animation to be controlled.

Figure 5:
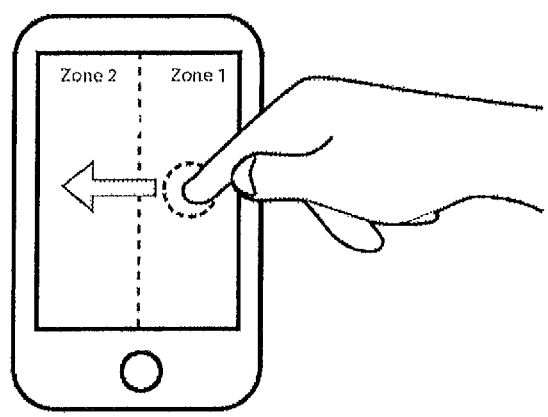

This process is carried out in 3 steps:
1. The user places his finger
2. The user moves his finger
3. The user lifts his finger Step 1 enables, depending on the start position, the page turning direction to be determined (means to detect the target page). The touch zone is virtually cut vertically into two possible start zones of equal width (FIG. 5). By placing a finger on one of the two zones, the user indicates that he wants to either go to the next page or return to the previous page.

In FIG. 5, the user places his finger in zone 1. The method therefore detects that he requests passage to the next page (respectively, zone 2 enables a return to the previous page).

Figure 6:
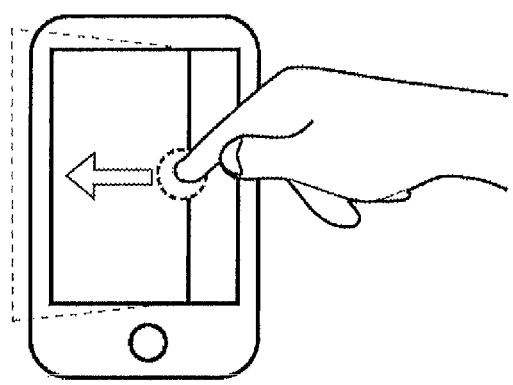

When the user slides his finger horizontally, the animation of the page to be displaced (or target page, defined by the start zone) follows his finger. The translation on the axis (O,x) is equal to the displacement deltaX between the start position and the actual position of the finger (FIG. 6).

When the user lifts his finger, animation automatically follows it, either:
- to the final position of the animation if the displacement deltaX is equal to or greater than a minimum displacement.
- to the initial position of the animation if the displacement is less than a minimum displacement.

This minimum displacement is equal to 30% of the width of the screen.

An exception to the animation is provided for the last page: For the "next page" command (start in zone 1), a multiplicative factor of 0.5 is applied to deltaX to calculate the translation when the animation is controlled by the finger and, regardless of the deltaX value when the user lifts his finger (if it is greater than or less than the minimum displacement), the page will return to its initial location.

The purpose of this multiplicative factor is to simulate strong friction or resistance to page turning in order to indicate to the reader that this is the last page and that it will not turn.

The complete sequence may be repeated indefinitely. As the end of page turning animation is independent from the control means, another animation can be launched while the previous has not ended, therefore giving the impression of multipage turning.

Landscape Mode

Figure 7:
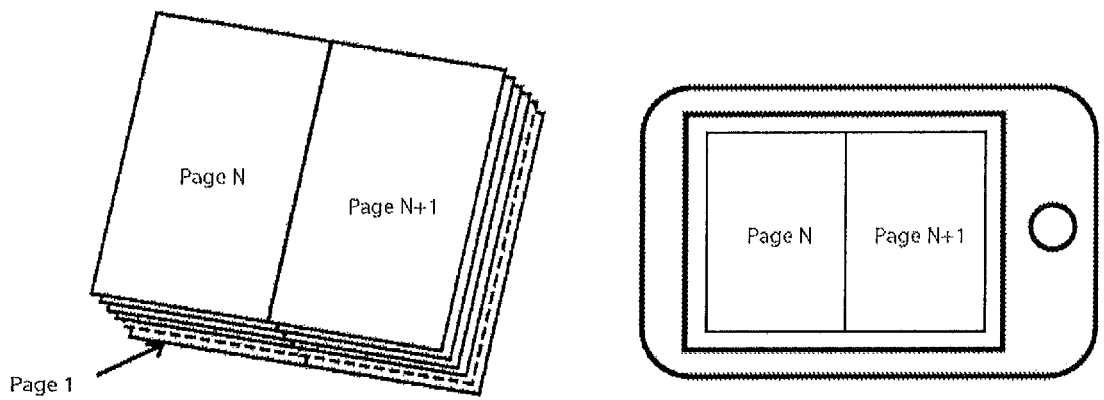

Landscape mode offers the user a representation that is faithful to the work (material representation). Therefore, each page has a front and a back. As the screen is wider, the display means may then present two pages from a digital publication. In concrete terms, the pages are positioned in two side-by-side stacks (FIG. 7). The previous pages are in the stack on the left and the following pages are in the stack on the right. The left stack is ordered in ascending order, while the right stack is in descending order.

Figure 8:
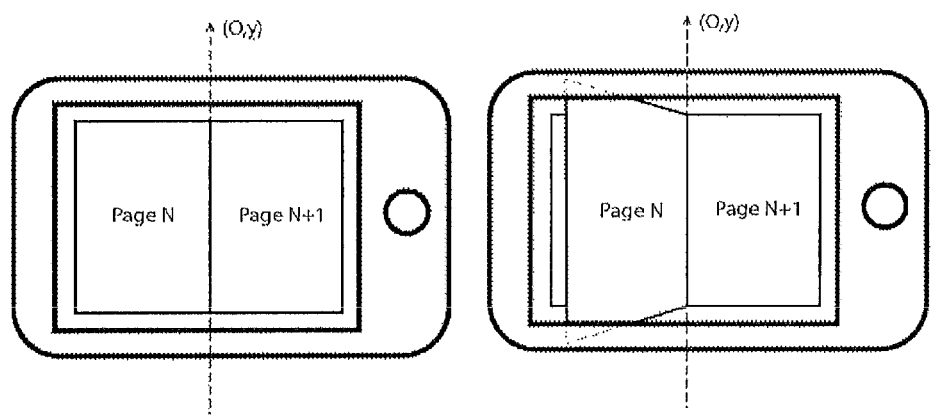
Figure 9:
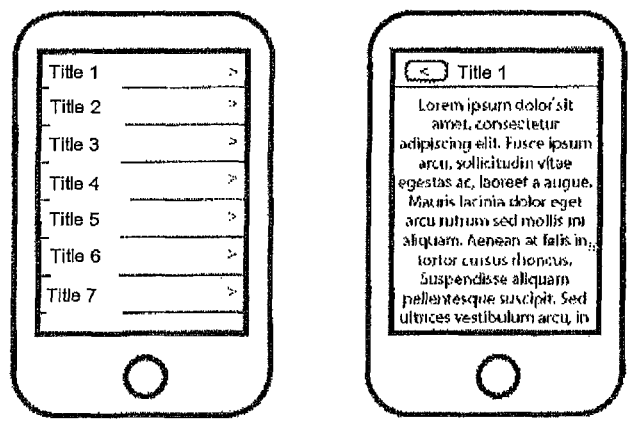

Passage from one page to another for this mode: Animation is done by a page turn along the central axis (O,y) in order to faithfully reproduce a real page turn relative to the fold (FIG. 8).

The animation command and control means are based on the same principles as described in the part relating to "animation initiation and control":

The screen is separated into two virtual zones to determine the direction of animation. These zones define the detection means and correspond to the two displayed pages. The touched page becomes the page targeted by the animation.

Animation is controlled by the finger. For this mode, the equation giving the angle of rotation according to the displacement deltaX is: angle=deltaX*180/screen width.

When the finger is lifted, if the minimum distance (30% of the width) is covered, animation to the final value (180°) is initiated, if not, animation to the initial value (0°) is initiated.

It will be noted that there is no exception to the animation for the last page. The "fourth cover page" should be able to be seen.

In addition, for the two modes (portrait and landscape), the edge effects are to be managed. (Example: it is impossible to select a preceding page (zone 2) when on the first page)

Reading Processes

Once the page is located, the terminal according to the invention offers two possibilities to access its content in order to read the page.

Reading in Text Mode

Reading in text mode is initiated by a combination of ergonomic keys or gestures defined according to the reading terminal. Example: Pressing the finger without sliding, dedicated key, etc.

Reading in text mode is done twice:
  A first screen presenting all the titles of the page being read (and only those titles), inviting the reader to select one. If the article includes an image, the image may be associated as a thumbnail image.
  A page for reading the selected article.

The list of articles (FIG. 9) can be scrolled downward if the list of articles is long and cannot be displayed in full. In the same way, the text of the article may also be read in full. Scrolling is controlled by sliding the finger vertically on the screen of the terminal.

Reading in Zoom Mode

The reading mode in zoom mode enables reading directly from the searching views.

This mode enables the page to be zoomed in/zoomed out and the page to be displaced as it is displayed; therefore, its formatting is not altered. This reading mode is initiated by a combination of ergonomic keys or gestures defined depending on the terminal (Example: Bringing the fingers closer together/farther apart (if the terminal allows this), double tap of the finger, scroll wheel, up/down keys, etc.).

Figure 10:
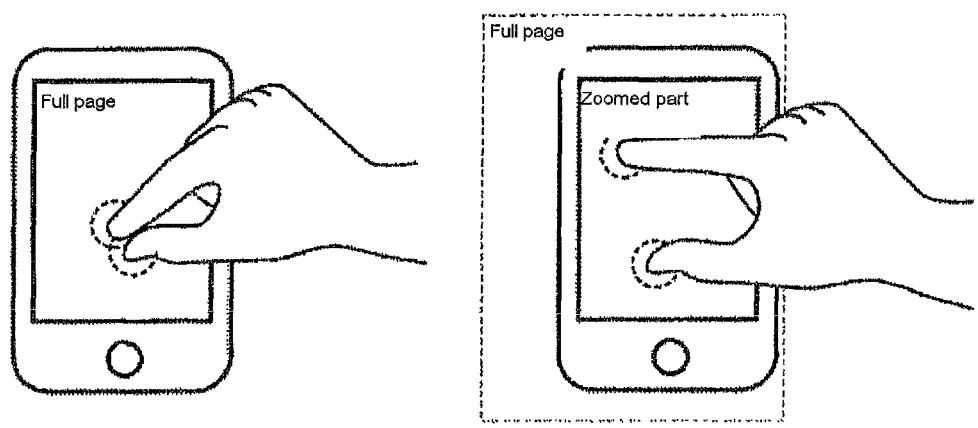
Figure 11:
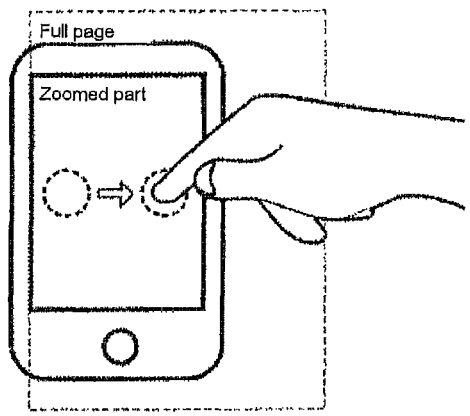

In zoomed reading, only part of the page is displayed (FIG. 10). Therefore displacement in the page is done by sliding the finger (FIG. 11).

Example of Technical Implementation

In the case of an iPhone/iPod Touch (Apple, Objective-C programming language) terminal, implementation of the invention may be as follows (cf. FIG. 12):
  A "LeafViewController" controller manages the two presentation modes in View form and enables passage from "portraitView" to "landscapeView" according to the orientation of the apparatus.
  The two views implement the "LeafView" interface (or protocol) that adds two layers to them: "backgroundLayer" and "rootLayer." The first contains a background image while the second contains sublayers containing pages. They also benefit from a "zoomView" that is displayed over the layers during passage into zoom mode.
  Each page layer establishes its content from a source image in PNG or JPEG format
  zoomView inherits from the UIScrollView class (enables displacement and zooming) and is composed of a tiledLayer: A layer for progressive loading on several zoom levels that will enable the image to be gradually established in high definition by flattening a PDF source.

Figure 12:
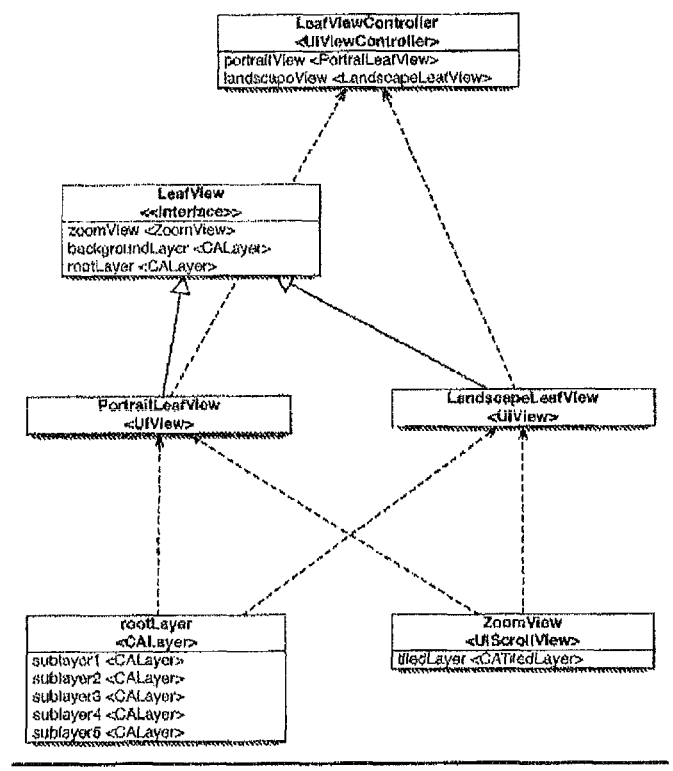

The meaning of the arrows used in FIG. 12 is given in table 1 below:

TABLE 1

| Solid arrows: "implements" | Between quotation marks: base class |
|---|---|
| Dotted arrows: "is linked to" | Between double quotation marks: Interface |

Page Pre-Loading Process

For the sake of performance and memory, all the pages in a stack will not be loaded at once. Only the N pages preceding and following the displayed page will be loaded. N being set and having a minimum value of 2. The stack therefore comprises, outside of edge effects, a minimum of 5 loaded pages. Every time a page is turned, the displayed page changes and the pages are loaded and unloaded according to this new value.

The invention claimed is:
1. A mobile terminal with a touch screen, the terminal comprising:
  a storage device on which a plurality of pages are stored;
  a display device configured to display in landscape mode simultaneously a left stack of recto verso pages and a right stack of recto verso pages, the recto verso pages of the left stack ordered in the ascending direction and the recto verso pages of the right stack ordered in the descending direction, or said display device configured to display a single stack containing all of the recto verso pages, ordered in the ascending or descending direction, all of the recto verso pages belonging to the plurality of stored pages;
  a pre-loading device configured to pre-load at least two recto verso pages preceding a current verso page N−1 displayed in the left stack, and/or at least two recto verso pages following a current recto page N displayed on the right stack, on said display device, said pre-loadings carried out within the limit of the number of pages respectively preceding and/or following the current verso page N−1 of the left stack and the current recto page N of the right stack;
  a controller configured to control said display device, the controller comprising
    a detection touch device configured to detect the placement, sliding and lifting of a finger of a user;
    a detecting device configured to detect a target page that is defined as being either the current verso page N−1 of the left stack or the current recto page N of the right stack, depending on the detection of the finger placement;
    an executing device configured to execute a rotation and/or translation composite of said target page;

a device for going from the current verso page N−1 and current recto page N, to next recto verso pages N+1/N+2 in the right stack of recto verso pages, or to preceding recto verso pages N−3/N−2 in the left stack of recto verso pages, depending on the detection of the lifting of a finger;

a device for going from said next recto verso pages N+1/N+2 to following recto verso pages N+3/N+4 that follow next recto verso pages N+1/N+2 while the passage from current recto verso pages N−1/N to next recto verso pages N+1/N+2 is in progress;

a device for going from said preceding recto verso pages N−3/N−2 to preceding recto verso pages N−5/N−4 that precede preceding recto verso pages N−3/N−2, while the passage from current recto verso pages N−1/N to preceding recto verso pages N−3/N−2 is in progress, wherein an end of page turning animation displayed on the display device is independent of a control of another page turning animation displayed on the display device, and wherein a rotation R of said target page is defined as follows: R=(delta X*180)/width of the touch screen, wherein delta X corresponds to a displacement of the finger of the user on the touch screen along the width of the touch screen.

2. The mobile terminal according to claim 1, wherein said controller comprises:

a device to stop the passage from said current recto verso pages N−1/N to the next recto verso pages N+1/N+2, and returning from the next recto verso pages N+1/N+2, to the current recto verso pages N−1/N;

a device to stop the passage from said current recto verso pages N−1/N to the preceding recto verso pages N−3/N−2, and returning from the preceding recto verso pages N−3/N−2, to the current recto verso pages N−1/N.

3. The mobile terminal according to claim 1, wherein said device to go from the current recto verso pages N−1/N to the next recto verso pages N+1/N+2 or to the preceding recto verso pages N−3/N−2 depending on detecting the lifting of a finger make the current recto verso pages N−1/N go to the next recto verso pages N+1/N+2 or to the preceding recto verso pages N−3/N−2, provided that the sliding has reached a threshold value.

4. The mobile terminal according to claim 1, wherein said controller comprises an executing device to execute a composite of a variable angle rotation and/or a variable vector translation, of said target page, said variations being dependent on said detected sliding.

5. The mobile terminal according to claim 1, wherein the terminal comprises an emitting device to emit a sound effect during passage from the current recto verso pages N−1/N to the next recto verso pages N+1/N+2 or to the preceding recto verso pages N−3/N−2.

6. The mobile terminal according to claim 1, wherein when delta X is greater than one third of the width of the touch screen, the page turning animation is triggered.

* * * * *